UNITED STATES PATENT OFFICE.

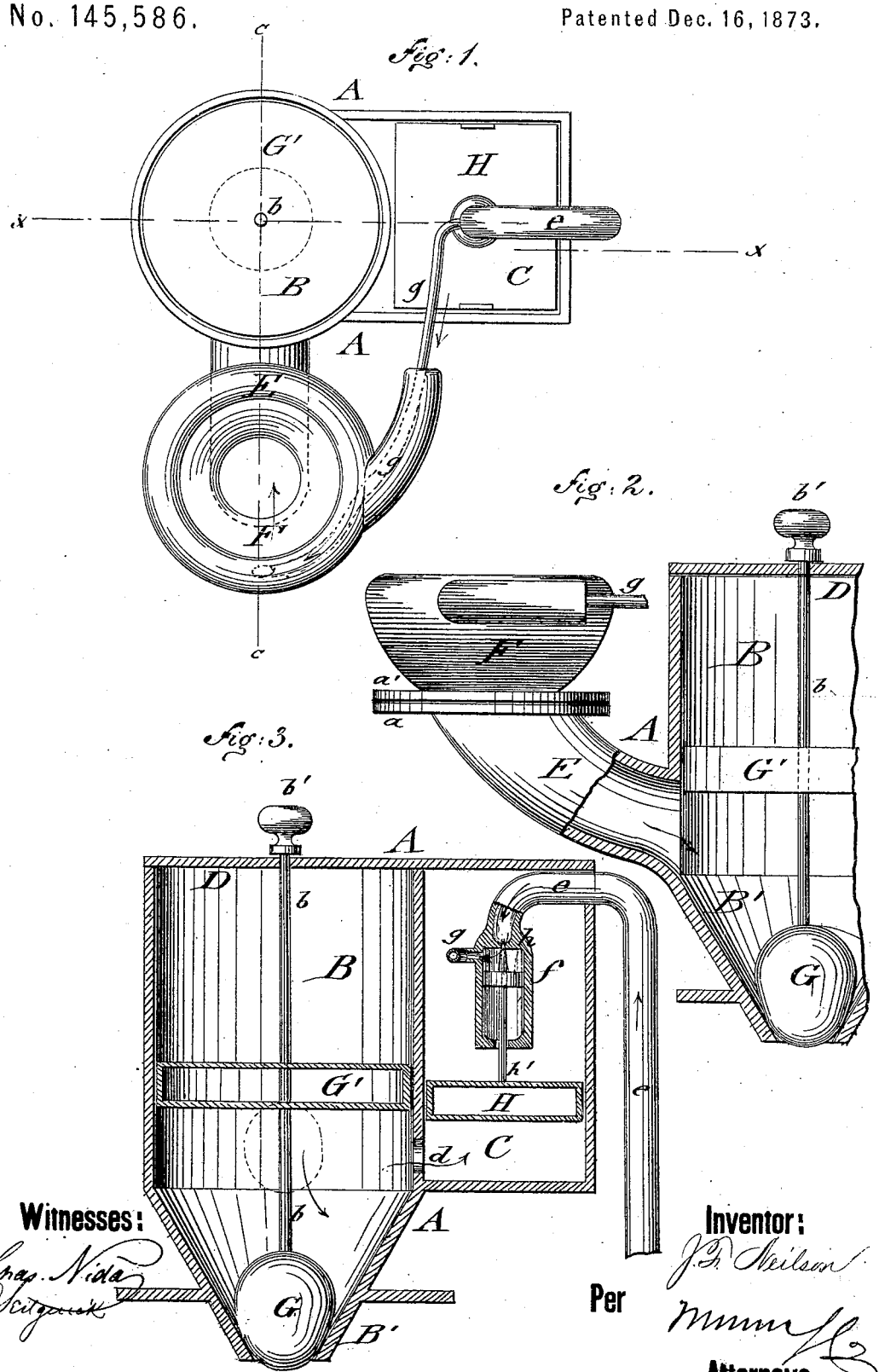

JOHN F. NEILSON, OF NEW YORK, N. Y.

IMPROVEMENT IN WATER-CLOSETS.

Specification forming part of Letters Patent No. 145,586, dated December 16, 1873; application filed August 4, 1873.

*To all whom it may concern:*

Be it known that I, JOHN F. NEILSON, of the city, county, and State of New York, have invented a new and Improved Water-Closet; and I do hereby declare that the following is a full, clear, and exact description of the same, reference being had to the accompanying drawing forming a part of this specification.

In the accompanying drawing, Figure 1 represents a top view of my improved water-closet; Fig. 2, a side view, partly in section, on the line $c\ c$, Fig. 1; Fig. 3, a vertical transverse section on the line $x\ x$, Fig. 1.

The invention will first be fully described, and then pointed out in the claim.

A represents the casing containing the chambers B C, which are both closed by a lid, D. A forward-extending elbow-pipe, E, connects the basin F with the chamber B. B' is the valve-seat through which the contents of the closet are transmitted to sink. It is closed tightly by a round valve, G, attached to a vertical rod, $b$, which passes up through lid D, and has a knob, $b'$. On rod $b$, at a suitable height above valve G, is placed a piston, G'. An aperture, $d$, in the partition between chambers B C, allows the water to seek the same level in each. The water-supply pipe $e$ enters near the top of chamber C and empties into a chamber, $f$, which has a pipe, $g$, discharging into the basin F. A valve, $h$, and float H are connected by a rod, $h'$, that may be guided by a disk working in chamber $f$.

The operation is as follows: The valve G is opened by lift-handle $b'$, when all the water and other matter are discharged from basin F and elbow-pipe E through valve-seat B'. The float H then sinks in chamber C, carrying with it the valve $h$. This opens supply-pipe $e$ and admits water through pipe $g$ to the basin F; thence through the elbow E to chamber B. On releasing the handle $b'$ the valve G resumes its former position, having sufficient weight to carry it to its seat. Water now gradually enters, through aperture $d$, into chamber C, raises float H with valve $h$, and closes the supply-pipe. It will, however, frequently occur that the valve $h$ will stick and fail to close off this water. This produces an overflow if some outlet is not provided. To avoid this, I use the chamber $f$ and the intervening piston that works between the valve and float. This greatly lessens the chances of sticking, but will not always prevent it. To provide an outlet to meet this contingency, I use the piston G' on the rod $b$. This piston not only serves as a guide to cause the valve to pass perpendicularly to its seat, but as soon as the water reaches it, it will be lifted and carry with it the valve G, thus opening an outlet for the surplus water, and preventing an overflow.

Having thus described my invention, what I claim as new, and desire to secure by Letters Patent, is—

The combination, with a lift-valve and water-chamber, B, pipe E, and basin F, of the disk G', placed on the same rod as the valve, and not only serving as a guide, but lifting the latter when itself pressed by the water, thus providing an outlet for any surplus of water and entirely precluding the possibility of an overflow.

JOHN F. NEILSON.

Witnesses:
T. B. MOSHER,
ALEX. F. ROBERTS.